(12) United States Patent
Patterson

(10) Patent No.: US 11,708,086 B2
(45) Date of Patent: Jul. 25, 2023

(54) OPTIMIZATION FOR DISTRIBUTING AUTONOMOUS VEHICLES TO PERFORM SCOUTING

(71) Applicant: Waymo LLC, Mountain View, CA (US)

(72) Inventor: Katharine Patterson, San Francisco, CA (US)

(73) Assignee: Waymo LLC, Mountain View, CA (US)

(*) Notice: Subject to any disclaimer, the term of this patent is extended or adjusted under 35 U.S.C. 154(b) by 288 days.

(21) Appl. No.: 17/028,576

(22) Filed: Sep. 22, 2020

(65) Prior Publication Data

US 2022/0089176 A1    Mar. 24, 2022

(51) Int. Cl.
*B60W 60/00*     (2020.01)
*G01C 21/34*     (2006.01)

(52) U.S. Cl.
CPC ....... *B60W 60/001* (2020.02); *G01C 21/3453* (2013.01); *B60W 2556/10* (2020.02)

(58) Field of Classification Search
CPC ........... B60W 60/001; B60W 2556/10; B60W 60/0025; G01C 21/3453; G01C 21/343; G06Q 10/02; G06Q 10/0631; G06Q 50/10; G06Q 50/30; G08G 1/202
See application file for complete search history.

(56) References Cited

U.S. PATENT DOCUMENTS

| | | | |
|---|---|---|---|
| 2013/0289858 A1* | 10/2013 | Mangiat | G05D 1/0027 701/117 |
| 2016/0157414 A1* | 6/2016 | Ackerman | A01B 69/008 701/25 |
| 2017/0123421 A1* | 5/2017 | Kentley | G06Q 10/00 |
| 2017/0262790 A1* | 9/2017 | Khasis | G08G 1/012 |
| 2017/0339820 A1* | 11/2017 | Foster | G01C 21/20 |
| 2018/0074499 A1* | 3/2018 | Cantrell | G05D 1/0094 |
| 2018/0136651 A1* | 5/2018 | Levinson | B60W 30/00 |
| 2018/0156770 A1* | 6/2018 | Saez | G01N 33/02 |
| 2018/0342165 A1* | 11/2018 | Sweeney | G08G 1/0112 |
| 2019/0145794 A1* | 5/2019 | Ketchell, III | G01C 21/3667 701/439 |
| 2019/0170529 A1* | 6/2019 | Tseng | G01C 21/3484 |
| 2019/0235501 A1* | 8/2019 | Cantrell | G06Q 10/08355 |
| 2019/0339709 A1* | 11/2019 | Tay | G06F 16/29 |
| 2020/0027354 A1* | 1/2020 | Goldman | G07C 5/008 |
| 2021/0174678 A1* | 6/2021 | Wright | G06Q 30/0226 |
| 2022/0236707 A1* | 7/2022 | Rangarajan | G05B 19/042 |

* cited by examiner

*Primary Examiner* — Peter D Nolan
*Assistant Examiner* — Peter Y Ning
(74) *Attorney, Agent, or Firm* — Botos Churchill IP Law

(57) ABSTRACT

Aspects of the disclosure relate to distributing vehicles to perform scouting. This may involve receiving a request for a scouting objective for a vehicle, and in response, identifying a set of scouting objectives that the vehicle is eligible to visit. Each scouting objective of the set is associated with one or more scouting quests, and each scouting quest is associated with a plurality of scouting objectives. For each given scouting objective in the set of scouting objectives, an overall weight may be determined using combined weights for the given scouting objective and any scouting quests with which the given scouting objective is associated. One or more scouting objectives of the set of scouting objectives may be selected using the determined overall weights. The one or more selected scouting objectives may be provided to the vehicle.

20 Claims, 9 Drawing Sheets

OPTIMIZATION FOR DISTRIBUTING AUTONOMOUS VEHICLES TO PERFORM SCOUTING

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Thus, such vehicles may be used to provide transportation services. Other systems which provide transportation services typically include drivers or conductors who are tasked with making decisions about how to operate vehicles. Such services may include some backend server systems which can dispatch vehicles to certain locations to provide transportations services as well as provide fleet management and vehicle staging instructions.

In addition, humans have historically "scouted" out areas by walking or driving them in order to capture images or make drawings. These have been used to create maps and other types of information. Typically, such scouting is performed by assigning persons to complete certain tasks or by having the vehicles drive around a service area randomly or in specific patterns when not otherwise required to be used for transportation services.

BRIEF SUMMARY

Aspects of the disclosure provide a method of distributing vehicles to perform scouting. The method includes receiving, by one or more processors, a request for a scouting objective for a vehicle; in response to the request, identifying, by the one or more processors, a set of scouting objectives that the vehicle is eligible to visit, wherein each scouting objective of the set is associated with one or more scouting quests, and where each scouting quest is associated with a plurality of scouting objectives; for each given scouting objective in the set of scouting objectives: for each given scouting quest associated with the given scouting objective, determining a first weight using a set of scouting objective parameters, for each given scouting quest associated with the given scouting objective, determining a second weight using a set of scouting quest parameters, determining a combined weight for each given scouting quest associated with the given scouting objective using the first weight for the given scouting quest and the second weight for the given scouting quest, and determining an overall weight using any determined combined weights, selecting, by the one or more processors, one or more scouting objectives of the set of scouting objectives using the determined overall weights; and providing, by the one or more processors, the one or more selected scouting objectives to the vehicle.

In one example, identifying the set of scouting objectives includes identifying scouting objectives within a service area of the vehicle. In another example, identifying the set of scouting objectives includes determining that the vehicle meets any requirements of the set of scouting objectives. In this example, the requirements include hardware requirements. In addition or alternatively, the requirements include software requirements. In another example, identifying the set of scouting objectives includes identifying scouting objectives based on proximity to the vehicle. In another example, identifying the set of scouting objectives includes identifying scouting objectives based on a time of a last visit. In another example, identifying the set of scouting objectives is based on a fixed number of scouting objectives which meets a latency requirement for providing scouting objectives. In another example, the set of scouting objective parameters includes a driving distance to a location of a scouting objective. In another example, the set of scouting objective parameters includes a time since a last visit to a scouting objective. In another example, the set of scouting objective parameters includes a whether a scouting objective has been visited. In another example, determining the first weight for the given scouting objective further includes combining the set of scouting objective parameters using weighted values. In this example, determining the first weight for the given scouting quest further includes determining the weighted values based on a tactic for completing each scouting quest with which the given scouting objective is associated. In addition, the tactic includes prioritizing scouting objectives that are closer to the vehicle over scouting objectives that are farther from the vehicle. Alternatively, the tactic includes prioritizing scouting objectives that were visited earlier in time. Alternatively, the tactic includes mimicking trip-like driving behavior. In another example, the set of scouting quest parameters includes a number of available vehicles to visit scouting objectives. In another example, the set of scouting quest parameters includes a time since a scouting quest has last been completed. In another example, determining the combined weight for each given scouting quest associated with the given scouting objective using the first weight for the given scouting quest and the second weight for the given scouting quest includes using adjustable weights for each combined first weight and second weight. In another example, determining the overall weight for the given scouting objective includes taking an average of the any determined combined weights.

DETAILED DESCRIPTION

Overview

Figure 1:
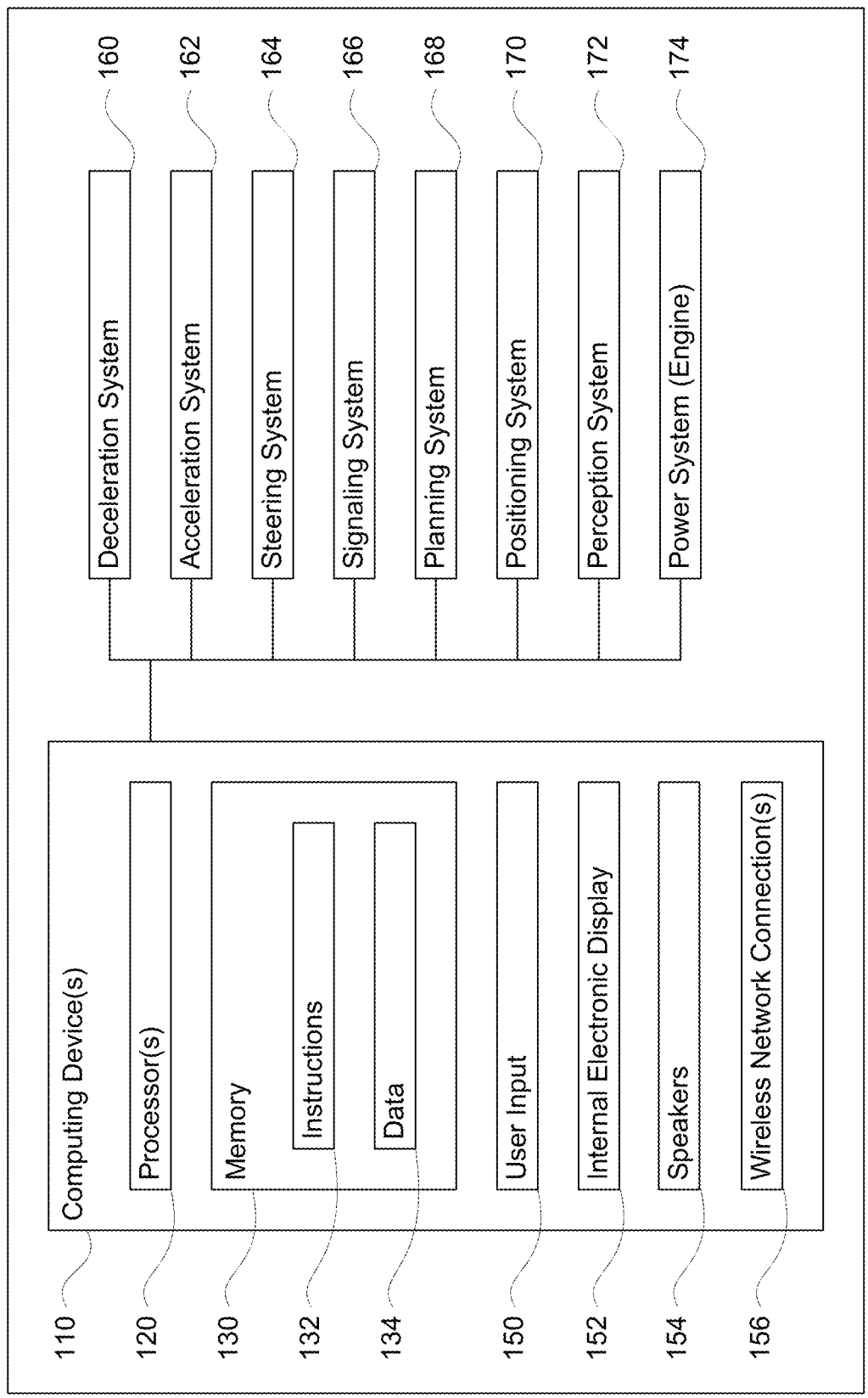
FIG. 1 is a functional diagram of an example vehicle in accordance with an exemplary embodiment.

The technology relates to using a fleet of autonomous vehicles to perform scouting tasks in order to ensure accuracy and freshness of map information as well as to gather targeted data for training models and testing code used on the autonomous vehicles. Typically, such scouting is performed by assigning persons to complete certain tasks or by having the vehicles drive around a service area randomly or in specific patterns when not otherwise required to be used for transportation services. However, for a fleet of autonomous vehicles which is also providing passenger and cargo transportation services, this can be a slow process which requires significant time and resources to complete. To address these problems, a fleet management system which employs a dispatching system and a scouting system can be used to manage a fleet of vehicles and achieve various scouting tasks and objectives.

The scouting system may be configured to define scouting quests, scouting objectives and track completion of those objectives. A scouting quest may include a plurality of scouting objectives to be completed within a given period of time or timeframe. However, while many scouting tasks such as visiting all intersections in the service area once per week, getting images of traffic lights for all intersections at night time once per month, passing through every street in the service area once per week, checking for wet or snowy areas after precipitation, passing through all construction zone areas twice per day, etc. can be generated based on pre-stored map information that identifies these features, when the world changes, such scouting tasks may not be sufficient to identify all changes.

To address this, vehicles can be distributed in a way that optimizes resource allocation and sends vehicles to the "highest priority" destinations for scouting objectives, factoring in the capabilities of the vehicles and the needs of the scouting system. In some instances, when vehicles are scouting, a single weighting optimization may be used to pick the next destination for any vehicle. This weighting may occur in real time and may be computed each time a vehicle needs a new destination. The weighting may involve two steps. First, weigh all viable scouting quests (for a particular vehicle) against each other and select one. Second, from the chosen quest weight all the scouting objectives in the quest against each other and select one to send to the vehicle. Both phases may use the same weights and combinations regardless of the scouting quest.

Alternatively, a framework that allows for the weighting of objectives that vary by scouting quest may be used. For instance, whenever a vehicle finishes a task and requests a new scouting objective (or destination), the scouting system may use an optimization to select the "highest priority" scouting objective for that vehicle to visit next.

To do so, the scouting system may first identify a set of all scouting quests for which a particular vehicle is eligible to scout or rather for which the vehicle meets the requirements (e.g. correct physical configuration or hardware, correct software version, etc.).

Various parameters may be determined for each of the scouting objectives and scouting quests each time the optimization is run. Scouting objective parameters may vary with the current location of the vehicle and other circumstances (such as traffic conditions, weather, etc.). Scouting quest parameters may be specific to each scouting quest.

When each scouting quest is set up, a human operator may select a particular tactic or strategy for completing that scouting quest. This may affect the optimization and thus the driving behavior in their quest. A tactic may be considered a formula for how to combine the scouting objective parameters to produce a single "weight" for a scouting objective but which effectively enables different driving behaviors for different tactics.

The scouting objective parameters can be determined in parallel as there are no interdependencies between parameters. To enable this, each scouting objective in the subset may be associated with an object that allows for the annotation of the scouting objective with various pieces of calculated information (parameters) that will feed into the optimization. As noted above, each scouting objective may be associated with one or more scouting quests, and each scouting quest as an associated tactic.

Next using the tactic and the scouting objective parameters, a weight for each scouting objective may be determined. Different weight values may be determined for each scouting quest with which the scouting objective is associated. Accordingly, each scouting objective may be associated with a weight for each scouting quest with which the scouting objective is associated such that each scouting objective may have multiple weights.

In order to create weight values for the scouting quests so that different quests can be given different priorities, the scouting quest parameters may be combined via a formula that has adjustable weights. The weight values determined for each scouting objective/scouting quest combination may be combined with the weight for that scouting quest, again via a formula that also has adjustable weights.

The combined weights for each scouting quest may then be combined with one another to determine an overall or final weight for the scouting objective. The overall weights may then be used to rank or order the scouting objectives of the subset. The highest weighted or top few highest weighted scouting objectives may be selected and send to the vehicle. If more than one scouting objective is sent to the vehicle, this may enable the vehicle itself to determine whether and when it visits the scouting objectives.

The features described herein may enable a more effective allocation of resources for scouting while at the same time promoting the goals (e.g. tactics) desired by human operators. The optimization considers scouting objectives in all the scouting quests a vehicle is eligible for, rather than picking a scouting quest up front and then only, considering objectives within it. This allows a more global optimization of the problem. In addition, having separate distinct steps controlled by formulas allows for the evaluation of the performance of different formulas at different steps independently and enables for the simulation of the effects of changing each variable in each formula, and different compositions of each formula, while keeping all else constant.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone), various electronic displays (e.g., a monitor having a screen or any other electrical device that is operable to display information), and speakers 154 to provide information to a passenger of the vehicle 100 as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the vehicle 100 and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system in order to signal the vehicle's intent to other drivers or vehicles, for example, by lighting turn signals or brake lights when needed.

Routing system 166 may be used by the computing devices 110 in order to generate a route to a destination. Planning system 168 may be used by computing device 110 in order to follow the route. In this regard, the planning system 168 and/or routing system 166 may store detailed map information, e.g., highly detailed maps identifying a road network including the shape and elevation of roadways, lane lines, intersections, crosswalks, speed limits, traffic signals, buildings, signs, real time traffic information, pull-over spots, vegetation, or other such objects and information.

Figure 2:
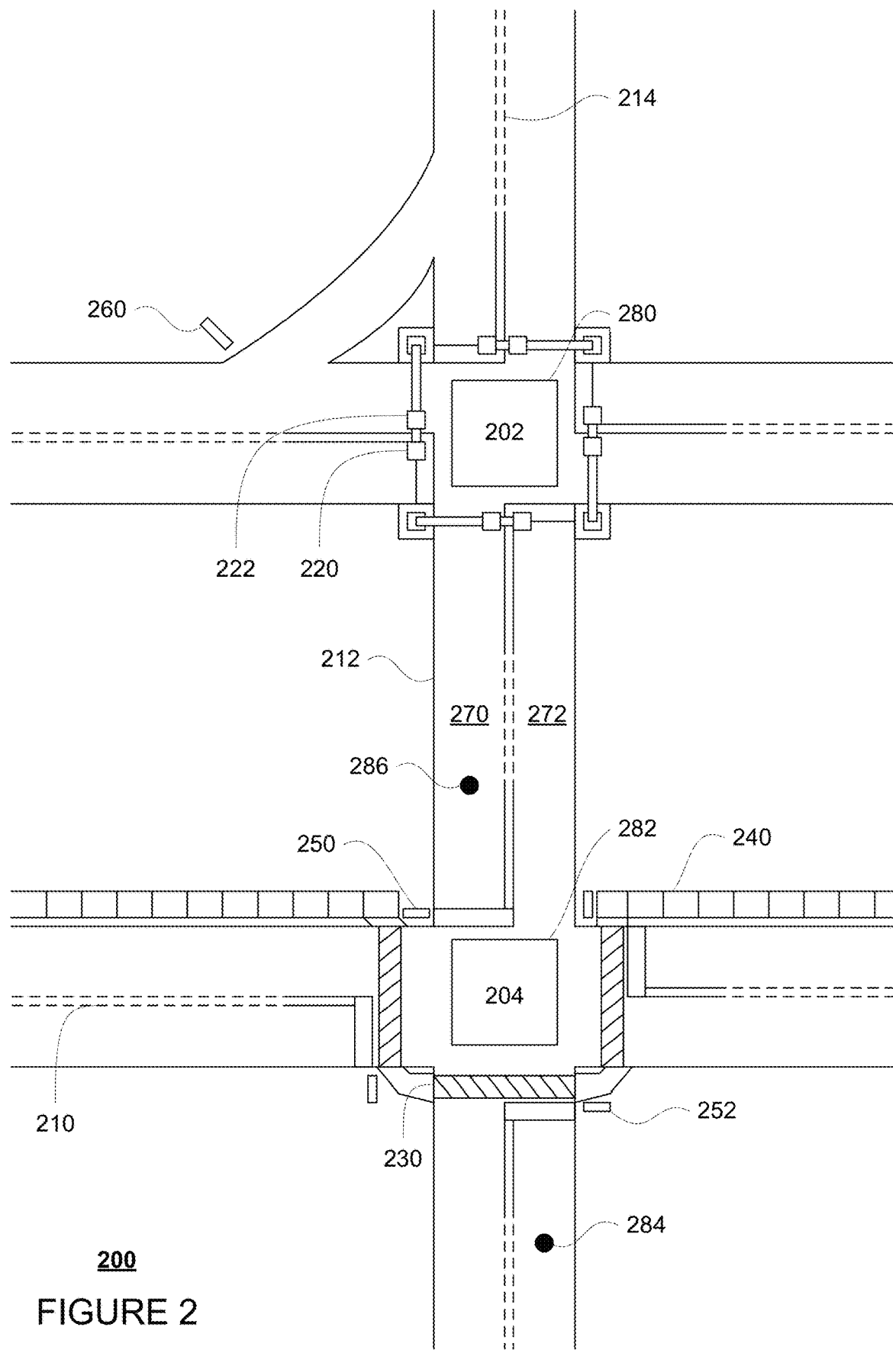
FIG. 2 is an example of map information in accordance with aspects of the disclosure.

FIG. 2 is an example of map information 200 for a section of roadway including intersections 202 and 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214 defining lanes 270, 272, traffic signal lights 220, 222, crosswalk 230, sidewalks 240, stop signs 250, 252, and yield sign 260. The map information may also store a plurality of scouting objectives and scouting quests as discussed in further detail below. In this example, polygon 280 represents a scouting objective for capturing sensor data for intersection 202, polygon 282 represents a scouting objective for capturing sensor data for intersection 204, and points 284 and 286 represent scouting objectives for capturing sensor data for stop signs 250 and 252, respectively. Although only a few scouting objectives are shown, this is merely for clarity and ease of understanding; the map information may actually include tens, hundreds or thousands of scouting objectives within the area of map information 200.

The routing system 166 may use the map information 200 to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 170 may also include other devices in communication with the computing devices computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
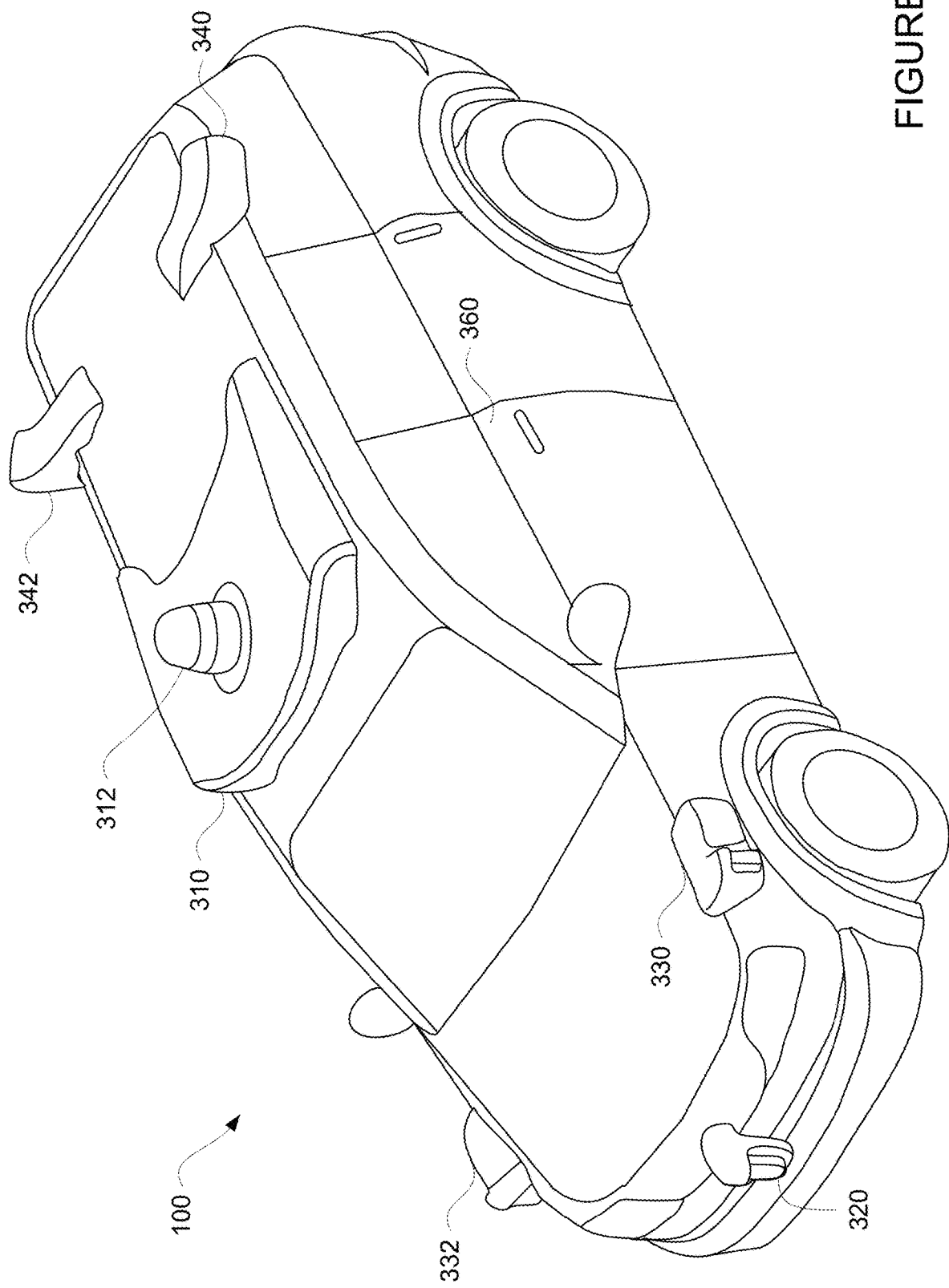
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 166. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
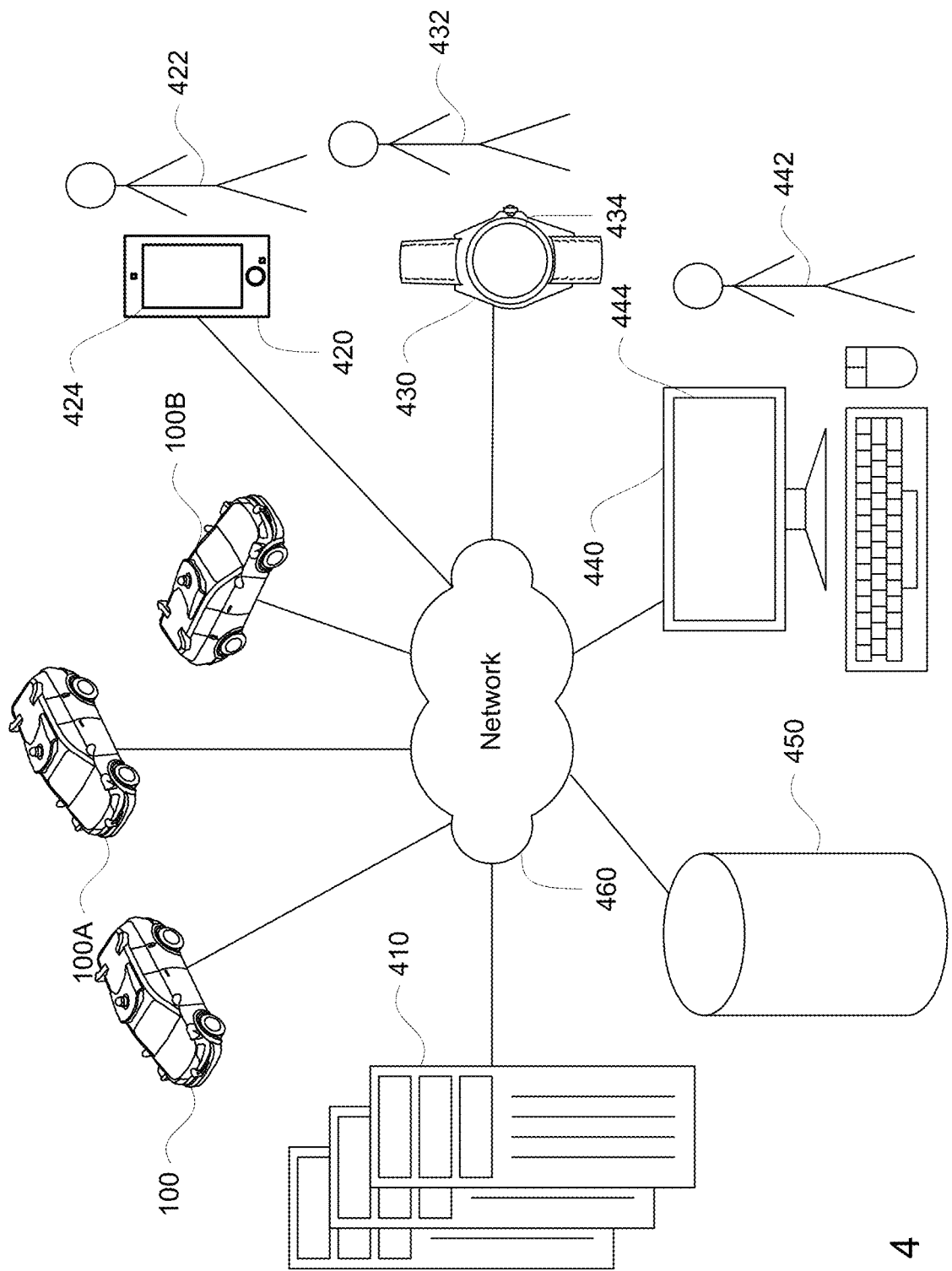
FIG. 4 is a pictorial diagram of an example system in accordance with aspects of the disclosure.
Figure 5:
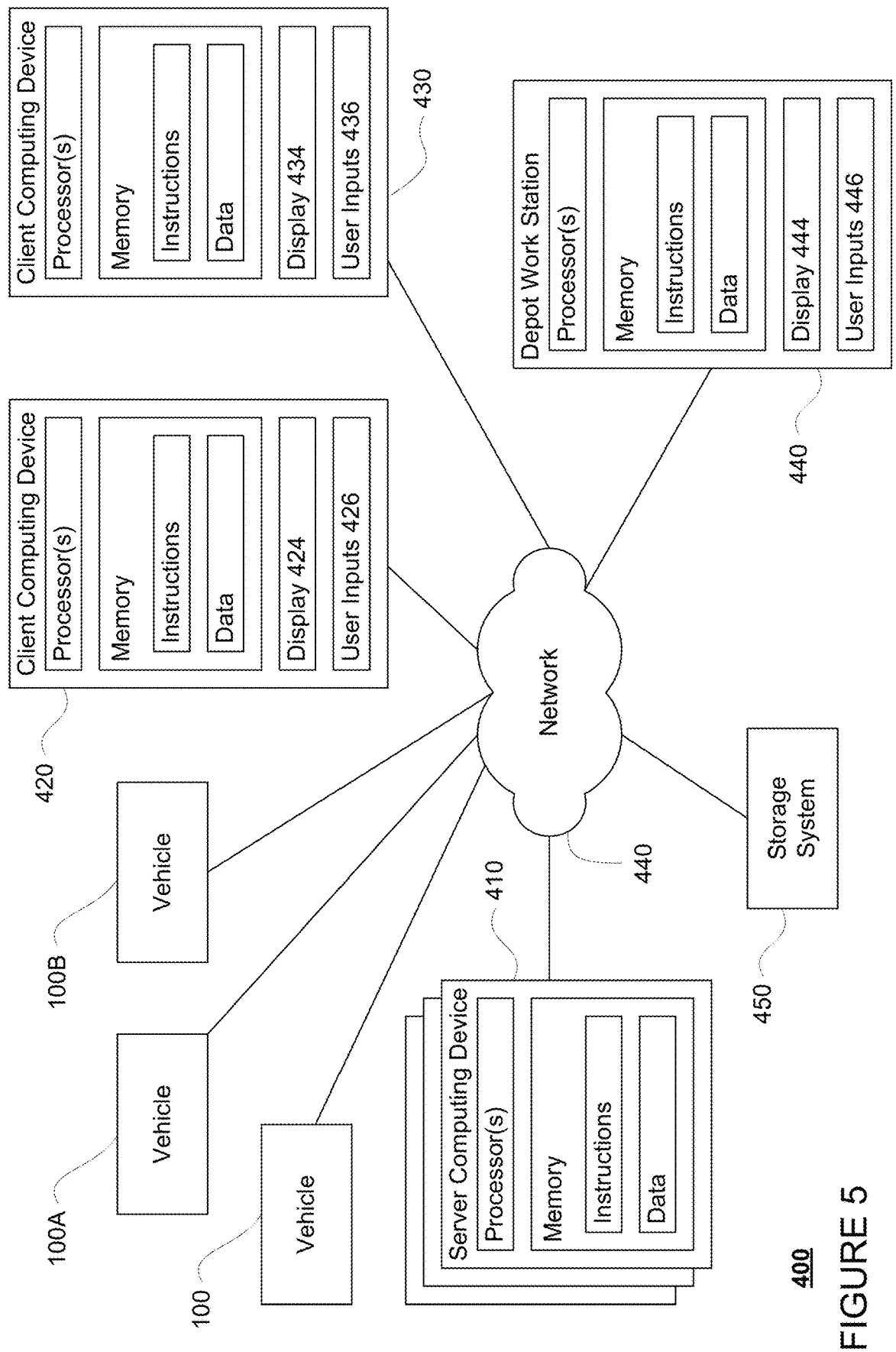
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100A and vehicle 100B, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A or vehicle 100B as well as computing devices 420, 430, 440 via the network 460. For example, vehicles 100, 100A, 100B, may be a part of a fleet of vehicles that can be dispatched by server computing devices to various locations. In this regard, the server computing devices 410 may function as a fleet management system (hereafter fleet management system 410) which can be used to dispatch vehicles such as vehicles 100, 100A, 100B to different locations in order to pick up and drop off passengers as well as to generate and track scouting quests and objectives as discussed further below. In addition, the fleet management system 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 420 may be a mobile phone used by passenger of a vehicle. In other words, user 422 may represent a passenger. In addition, client communication device 430 may represent a smart watch for a passenger of a vehicle. In other words, user 432 may represent a passenger. The client communication device 440 may represent a workstation for an operations person, for example, a remote assistance operator or someone who may provide remote assistance to a vehicle and/or a passenger. In other words, user 442 may represent a remote assistance operator. Although only a few passengers and remote assistance operator are shown in FIGS. 4 and 5, any number of such passengers and remote assistance operators (as well as their respective client computing devices) may be included in a typical system.

As with memory 130, storage system 450 can be of any type of computerized storage capable of storing information accessible by the fleet management system 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices of the fleet management system 410, in order to perform some or all of the features described herein.

Figure 6:
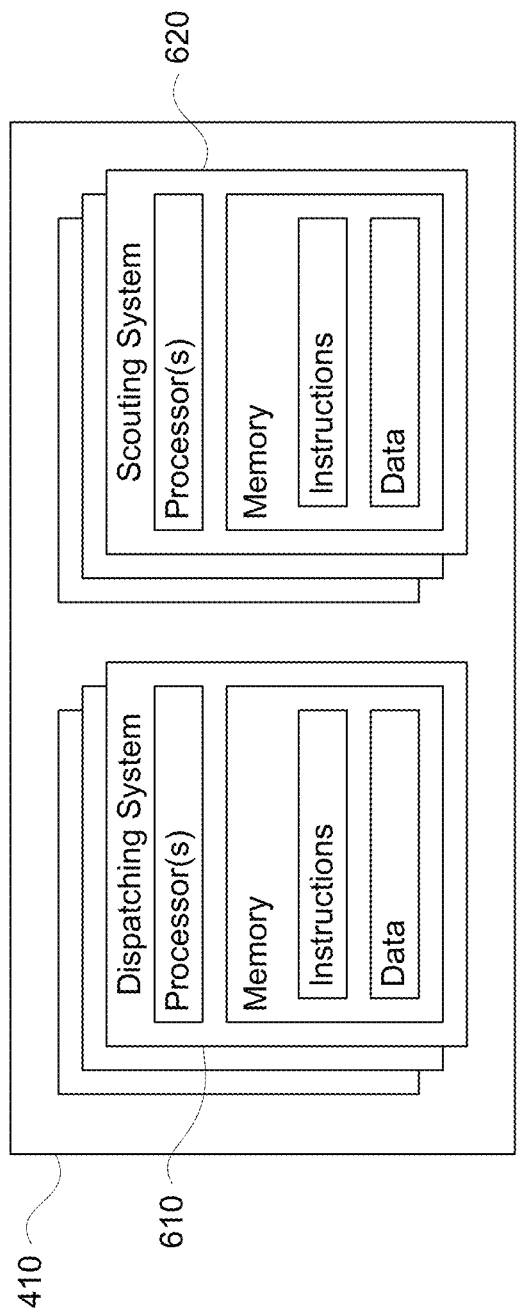
FIG. 6 is an example of a fleet management system in accordance with aspects of the disclosure.

FIG. 6 provides additional details of the fleet management system 410. In this example, the server computing devices may include a dispatching system 610 and a scouting system 620. Each of the dispatching system 610 and the scouting system 620 may include one or more computing devices configured, for instance, as shown with respect to the fleet management system 410. Although the dispatching system and the scouting system are depicted as distinct computing devices, these may be actually the same computing devices or the same group of computing devices and may be located proximate to one another or at great distances.

The dispatching system 610 may be configured to select vehicles for ride or transport services depending upon locations of the vehicles, passengers and/or cargo, destinations, etc. This information, including the locations of vehicles, status of passengers and/or cargo, destinations, etc. may be tracked, for instance, in a status table of the storage system 450. In this regard, all or part of the storage system 450 may be remote from or part of dispatching system 610 and/or fleet management system 410. The dispatching system 610 may also track the state of the vehicles using information that is periodically broadcast by the vehicles, specifically requested by the dispatching system and provided by the vehicles, or using other methods of tracking the states of a fleet of autonomous vehicles. This periodically broadcast information may include messages providing all state information for a given vehicle. For instance state messages may be self-consistent and generated based on rules about packaging the messages from various systems of the vehicles. As an example, the messages may include vehicle pose, lane information (i.e., in what lane the vehicle is currently traveling), as well as other information, such as whether the vehicle is currently providing transportation services, experiencing any errors or problems, etc.

The scouting system 620 may be configured to define scouting quests and scouting objectives, as well as to track completion of those quests and objectives, for instance, in the storage system 450. In this regard, all or part of the storage system 450 may be remote from or part of scouting system 620 and/or fleet management system 410. A scouting quest may include a plurality of scouting objectives to be completed within a given period of time or a timeframe. For instance, a scouting quest may include visiting all unprotected left turns in a service area of the fleet at least once per week, visiting all intersections in the service area once at least per week, getting images of traffic lights for all intersections at night time at least once per month, passing through every street in the service area at least once per week, checking for wet or snowy areas after precipitation, passing through all construction zone areas at least twice per day, etc.

The scouting objectives may be inserted into map information used by the vehicles to identify and complete the scouting objectives and quests. Each scouting objective, such as the scouring objectives represented in the map information and described above with regard to FIG. 2, may generally include a location or area for a vehicle to visit in order to capture sensor data for that area. This area may be represented by a point, such as for points 284, 286, a polygon, such as for polygons 280, 282, circle (for instance represented by a point and a radius), lines between two or more points, or any other shapes. As an example, each area, point, polygon, circle, line or other shape, may be specific to a road segment and/or lane of the map information having a particular direction of travel. In this regard, by simply driving or passing through the road segment and/or lane, the vehicle is able to complete the scouting objective. The areas of the scouting objectives also may have different geometry and/or metadata depending on what type of scouting is being handled or rather what type of data is to be collected by the scouting objective.

In some instances, the scouting objectives may have certain constraints or vehicle requirements, such as certain software or hardware (e.g. sensor) versions, levels of urgency, or other constraints as discussed further below. This information may be inserted into the map information by periodically broadcasting this information to the vehicles of the fleet, such as vehicles 100, 100A, 100B, and/or downloading the data directly to the vehicles' computing devices. In addition, the storage system 450 may also store information about each vehicle's configuration (e.g. hardware and software) as well as identifiers and such that may allow the server computing devices of the fleet management system 410 and/or scouting system 620 to access and identify the configurations of each vehicle in order to perform the functions described further below.

Examples of scouting objectives may include intersection-based objectives, lane-level objectives, traffic light objectives, stop sign objectives, turning objectives (such as unprotected left turns, etc.), and so on. As one example, intersection-based objectives may be defined as areas such as polygons or other shapes leading up to an intersection, such as polygon 280 of FIG. 2 for intersection 202. By passing through the polygon 280, a vehicle may be able to capture sufficient sensor data for the intersection 202. As another example, maneuver-type objectives may include curves that map to lanes where precision is required to allow vehicles to complete certain types of maneuvers, such as where information about unprotected left turns, U-turns, speed limits, cul-de-sacs, merges, and other freeform navigational paths is required.

At least some of these scouting quests and/or scouting objectives may include constraints. For instance, if a scouting quest is designed to find real world changes, such as new intersections or roads before they are opened up, the scouting quest may include visiting every street within the service area once per week. Of course, the scouting objectives of this scouting quest may be constrained to visiting streets that are typically missed when performing typical transportation services from any direction. As another instance, a scouting objective may require a vehicle to visit a certain location at a certain time of day from a certain direction or perspective and/or during certain weather and/or lighting conditions. For example, if a scouting quest is designed to find changed traffic light configurations, the scouting quest may include capturing sensor data (for instance, camera images) of each traffic light in the service area once per day. In addition, the scouting objectives of this scouting quest may be constrained to capturing traffic lights from a certain perspective or direction such that the lights on the traffic lights are visible in a camera image.

As another example, a constraint could include the vehicle "turning-on" a particular functionality, for instance implemented in hardware and/or software, as the vehicle approaches a location. For instance, a vehicle could be required to turn on certain modes of sensing or computing when reaching a location, such as a machine learning model to detect traffic light configuration changes or new stop signs that is too expensive to run all the time, but can be run briefly as the vehicle passes through certain intersections in order to collect information for a scouting objective. Alternatively, rather than including explicit constraints in the scouting objective themselves, the scouting system could send commands to the vehicles to turn on the functionality as the vehicle approaches a location of a particular scouting objective.

As noted above, the scouting system 620 may also track the completion of scouting objectives and scouting quests. For instance, using the status messages from the vehicles, the scouting system may track the movements of the vehicles. From this, the scouting system may determine whether a vehicle has passed through a scouting objective and mark that scouting objective as completed. This may also include confirming whether the vehicle that completed the scouting objective has met any vehicle requirements for that scouting objective.

The status of the scouting objectives may be stored in a scouting database, for instance in a visit table of storage system 450. As an example, an entry in the table may include metadata about the visit including the vehicle identifier of the vehicle that visited, the autonomy mode of the vehicle at the time (to ensure the proper sensors were engaged to capture the sensor data), the time of the visit, etc. This information may allow engineers or other systems to retrieve the needed sensor data from the vehicles.

In addition, certain information in the table may be periodically refreshed. For instance, for a given quest which must be performed within a given period of time such as 7 days, the scouting objectives within the table may be "reset" to not complete after 7 days from the last time the scouting objective was visited. Of course, the table may still store the data for each prior visit for record keeping purposes.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

The fleet management system 410 and/or scouting system 620 may identify one or more scouting objectives for the vehicle as well as other vehicles of a fleet (e.g. vehicles 100, 100A, 100B) in a way that distributes vehicles so that the scouting objectives and scouting quests are to be efficiently visited and completed. As noted above, vehicles can be distributed by the fleet management system 410 in a way that optimizes resource allocation and sends vehicles to the "highest priority" destinations for scouting objectives, factoring in the capabilities of the vehicles and the needs of the fleet management system 410 and: scouting system 620. In some instances, when vehicles are scouting (or visiting scouting objectives and completing scouting quests), a single weighting optimization may be used to pick the next destination for any vehicle. This weighting may occur in real time and may be computed each time a vehicle needs a new destination. The weighting may involve two steps. First, the fleet management system 410 and/or scouting system 620 may weigh all viable scouting quests (for a particular vehicle) against each other and select one. Second, from the chosen quest, the fleet management system 410 and/or scouting system 620 may weigh all the scouting objectives in the quest against each other and select one to send to the vehicle. Both phases may use the same weights and combinations regardless of the scouting quest.

Alternatively, an optimization that allows for the weighting of objectives that vary by scouting quest may be used by the fleet management system 410 and/or scouting system 620. For instance, whenever a vehicle finishes a task and requests a new scouting objective (or destination), the fleet management system 410 and/or scouting system 620 may use the optimization to select the "highest priority" scouting objective for that vehicle to visit next.

Figure 9:
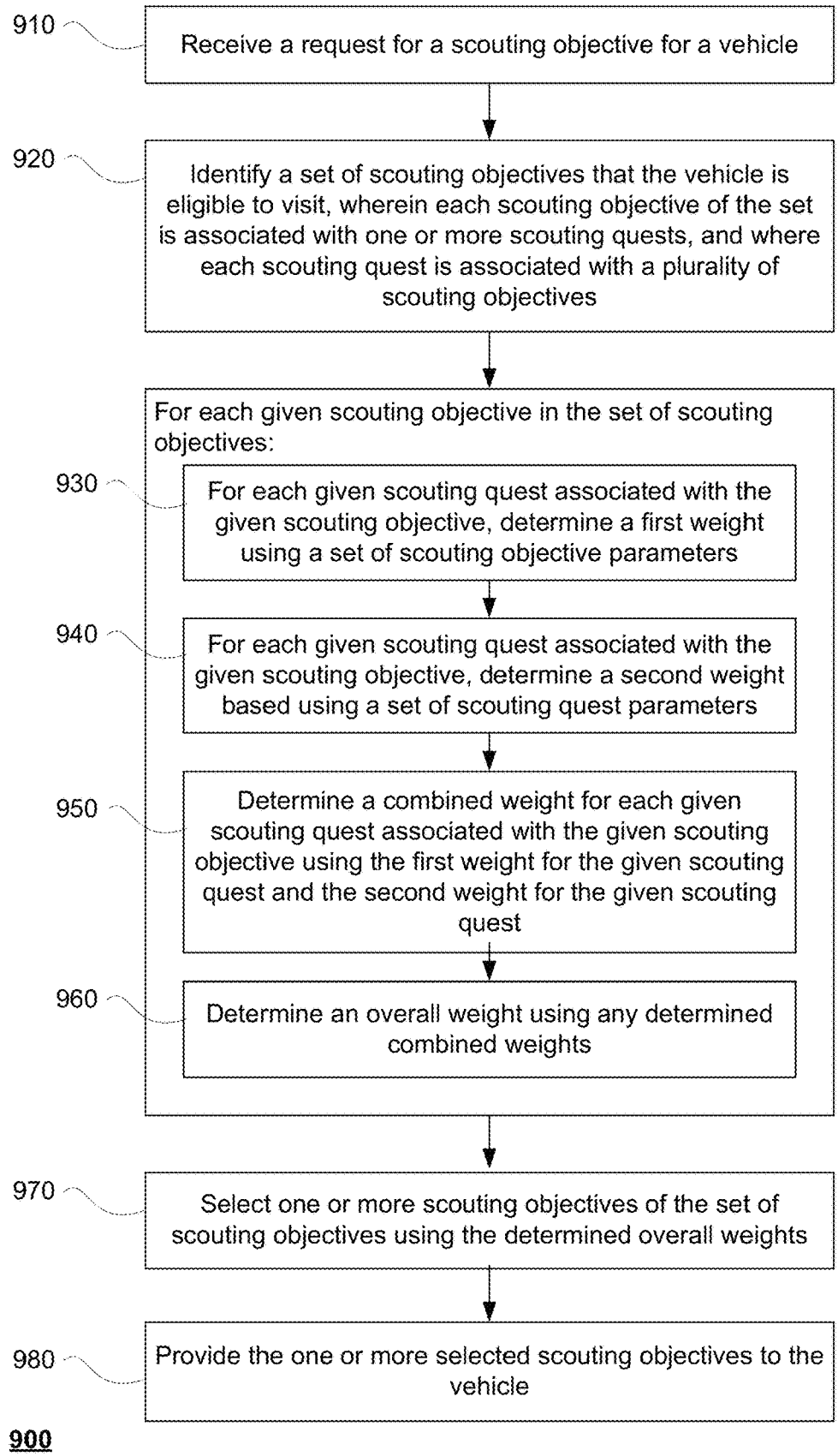
FIG. 9 is an example flow diagram in accordance with aspects of the disclosure.

FIG. 9 provides an example flow diagram 900 for generating scouting objectives in order to update map information used to control a fleet of vehicles in an autonomous driving mode, which may be performed by one or more processors of one or more server computing devices such as the processors of the server computing devices of the fleet management system 410 and/or scouting system 620. At block 910, a request for a scouting objective for a vehicle is received. For example, the computing devices 110 of the vehicle 100 may send a request for a new scouting objective or a plurality of new scouting objectives to the fleet management system 410 and/or scouting system 620. The fleet management system 410 and/or scouting system 620 may receive the request from the computing devices 110 of the vehicle 100. This request, and further communications between the vehicle and the server computing devices may be facilitated by the use of the network 460. The request and/or other messages sent by the vehicle (or rather, by the vehicle's computing devices 110) may identify information about the vehicle such as an identifier that can be used to determine the configuration of the vehicle (e.g. hardware and/or software configuration) for instance, from the data of the storage system 450, as well as the vehicle's current location.

Returning to FIG. 9 at block 920, in response to the request, a set of scouting objectives that the vehicle is eligible to visit is identified. Each scouting objective of the set is associated with one or more scouting quests, and where each scouting quest is associated with a plurality of scouting objectives. For instance, the fleet management system 410 and/or scouting system 620 may first identify a set of all scouting quests for which a particular vehicle is eligible to scout or rather for which the vehicle meets the requirements (e.g. correct physical configuration or hardware, correct software version, etc.). For example, the fleet management system 410 and/or scouting system 620 may access the storage system 450 (and/or local memory or other storage) in order to identify any scouting objectives for which a vehicle is eligible to scout. This may also involve identifying scouting quests that are within a service area for the vehicle or simply discarding or ignoring those that are not within the service area.

Figure 7:
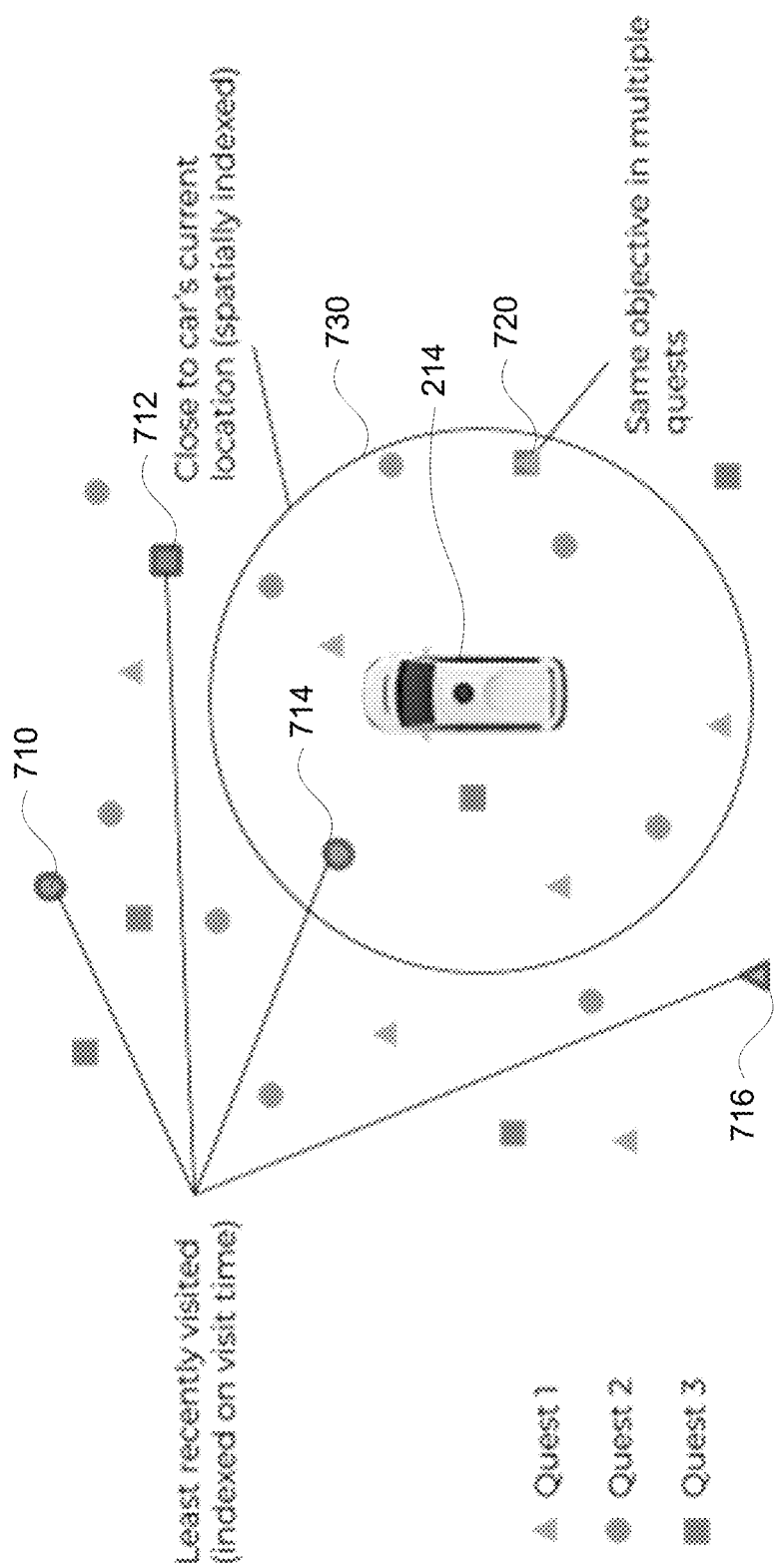
FIG. 7 is an example representation of a vehicle and scouting objectives in accordance with aspects of the disclosure.

FIG. 7 provides an example of all the scouting objectives for the scouting quests for which an example vehicle, such as vehicle 100, is eligible to scout. In this example, the vehicle 100 is eligible to scout for 3 scouting quests, Quest 1, Quest 2 and Quest 3. Each of these scouting quests is associated with a plurality of scouting objectives represented by triangles for Quest 1, circles for Quest 2 and squares for Quest 3. In addition, the fleet management system 410 and/or scouting system 620 may also identify which of these scouting objectives are associated with multiple different scouting quests as with scouting objective 720 which is associated with both Quest 1 and Quest 3 (and depicted as both a square and a triangle).

As depicted, the scouting objectives can be indexed spatially; for example, those that are within the area of circle 730 may be closest to the vehicle's current location. Such scouting objectives close to the vehicle may be associated with a fast lookup using the spatial index. In addition or alternatively, scouting objectives can be indexed temporally. For example, those that were scouted least recently (the longest time ago) or not visited at all may also be identified such as with scouting objectives 710, 712, 714, 716. Such scouting objectives may be associated with fast lookup of least recently visited and/or not visited at all using the temporal index.

Figure 8:
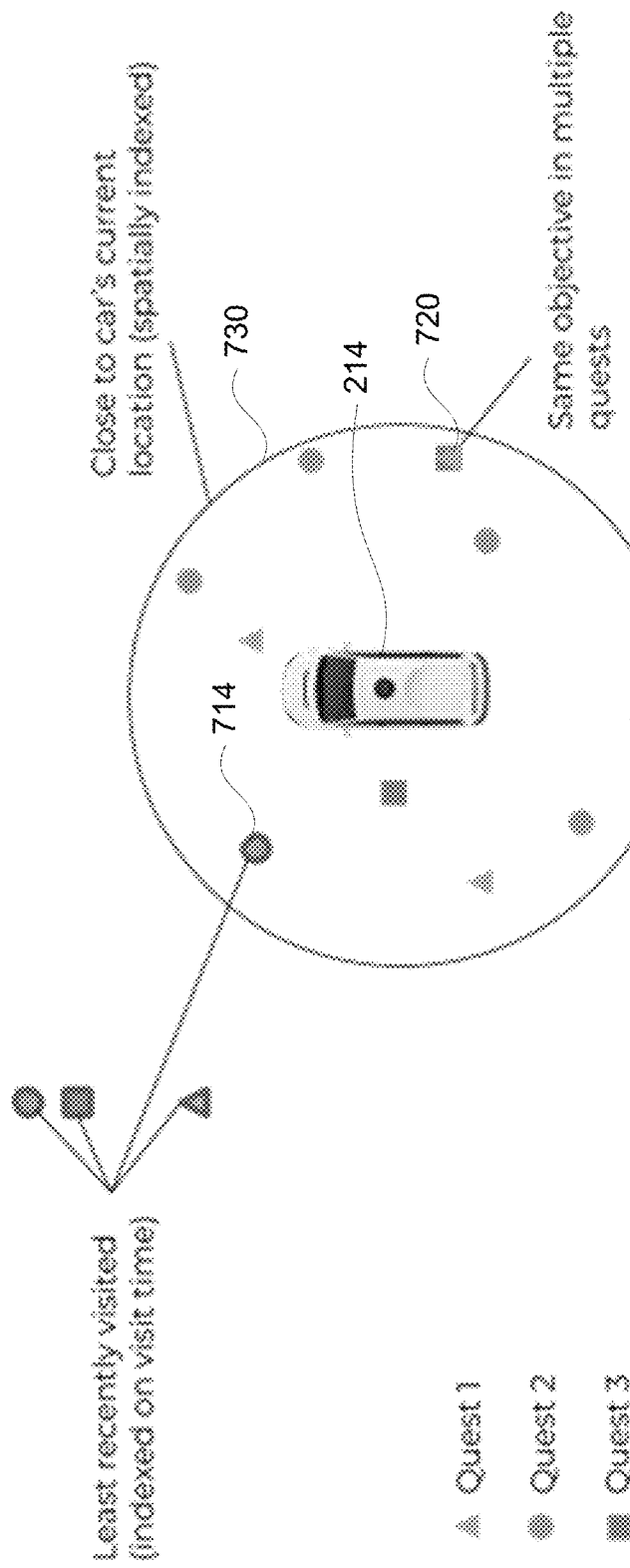
FIG. 8 is an example representation of a vehicle and scouting objectives in accordance with aspects of the disclosure.

As an example, a vehicle may be eligible to visit for some number of scouting quests, here N scouting quests, then the subset of scouting objectives (Objectives_of_interest) for optimization may be defined by the fleet management system 410 and/or scouting system 620 as:

Objectives_of_interest=($X$ nearest objectives+$Y$ least recently visited objectives)Quest 1+($X$ nearest objectives+$Y$ least recently visited objectives) Quest 2+ . . . +($X$ nearest objectives+$Y$ least recently visited objectives)Quest $N$ In this regard, the X nearest objectives and Y least recently visited objectives from each quest (here, Quest 1, Quest 2, . . . Quest N) may be included in the Objectives_of_interest. The values of X and Y may be chosen such that the size of the subset objectives_of_interest is a predetermined or fixed size equal to the maximum number of calculations which can be performed while meeting a latency requirement that corresponds to maintaining a reasonable latency for the request for a new scouting objective. FIG. 8 provides an example of a subset of objectives_of_interest for the vehicle 100 that may be selected from the scouting objectives of FIG. 7.

Returning to FIG. 9, at block 930, for each given scouting objective in the set of scouting objectives and for each given scouting quest associated with the given scouting objective, a first weight is determined using a set of scouting objective parameters. At block 940, for each given scouting objective in the set of scouting objectives and for each given scouting quest associated with the given scouting objective, a second weight is determined based using a set of scouting quest parameters. Various parameters may be determined by the fleet management system 410 and/or scouting system 620 for each of the scouting objectives and scouting quests each time the optimization is run. Scouting objective parameters may vary with the current location of the vehicle and other circumstances (such as traffic conditions, weather, etc.). Example scouting objective parameters may include the distance from vehicle to the scouting objective (e.g. as the crow flies), driving distance from the vehicle to the scouting objective (e.g. along a route), driving time for the vehicle to reach or visit the scouting objective (e.g. along a route), time since the scouting objective was last visited, whether the scouting objective has been visited at all (e.g. yes or no), whether the scouting objective is within a buffer distance from the vehicle's location (e.g. don't choose something within 20 meters of the vehicle's current location, because if the scouting objective is too close the vehicle may have passed the scouting objective before being assigned the scouting objective), the scouting objective's proximity to other scouting objectives, the difficulty in the vehicle reaching the objective via a route generated by the routing system (e.g. difficult or complex maneuvers such as U-turns or merges, likelihood of needing to switch from an autonomous mode to a manual driving mode, likelihood requiring remote or roadside assistance, etc.), etc. At least some of this information may be determined, at least in part, using the map information 200 as well as the vehicle's current location.

Scouting quest parameters may be specific to each scouting quest. Example scouting quest parameters may include, for instance, the time since the scouting quest was last completed, the priority of the quest (e.g. how quickly does the scouting quest need to be completed), the number of available vehicles that are eligible to scout for the scouting quest, etc.

When each scouting quest is set up, a human operator may select a particular tactic or strategy for completing that scouting quest. This may affect the optimization and thus the driving behavior in their quest. A tactic may be considered a formula for how to combine the scouting objective parameters to produce a single "weight" for a scouting objective but which effectively enables different driving behaviors for different tactics. In this regard, each scouting quest may be associated with a tactic and/or tactic definition. This information may also be stored in the storage system 450 (and/or local memory or other storage) and accessed by the fleet management system 410 and/or scouting system 620. The following is an example definition for a scouting tactic which relies upon the driving distance to the scouting objective from the vehicle's current location, the time since the scouting objective was last visited (Time_since_last_visit), as well as whether the scouting objective is unvisited or was never visited (Is_unvisited):

Example Tactic Definition 1=(Driving_distance_to_objective/$x$)+$y$(Time_since_last_visit)+(Is_unvisited+1)$^z$ In this example, x, y, and z may be adjustable weights which can be selected according to the prioritization of a particular tactic. The values for x, y, and z for each tactic may be learned over time, for instance through trial and error. Of course, such definitions may be combinations of different weights, and the above definition is just one example. Other definitions and values may also be used as discussed further below.

Some examples of Scout Tactics may include:

Prioritize nearby objectives highly and especially those that have not been recently visited, so that a vehicle scouting this scouting quest will make its way round the scouting objectives in order to visit them all as quickly as possible. ("Fast") In addition, when there are a large number of vehicles engaged in a quest, this may allow them to visit a large number of destinations quickly. In this example, for the Example Tactic Definition 1 above, x, y and z may be balanced such that each term in the definition has a similar weight. In this regard, this tactic may prioritize both Distance_to_objective and Time_since_last_visit, blending efficiency and thoroughness and best suited for quests with higher numbers of qualifying and available vehicles.

Prioritize visiting every scouting objective in the scouting quest, so it will enable a vehicle to travel further to visit an objective if the scouting objective has not been completed recently. This may be useful to guarantee traversal of 100% of the objectives in a scouting quest. As an example, this type of tactic may be appropriate for checking the status of construction zones in a service area or in a map. ("Pedantic") In this example, for the Example Tactic Definition 1 above, z may be a relatively higher value. Alternatively, a tactic definition for the Pedantic tactic may include: Pedantic Tactic=r (Time_since_last_visit)−q(Driving_distance_to_objective). For this tactic definition, q and r may be adjustable weights which can be selected according to the prioritization of the pedantic tactic. The values for q and r for the pedantic tactic may be learned over time, for instance through trial and error.

Prioritize scouting objectives with the shortest driving distance, regardless of when such scouting objectives were last seen. This tactic may be useful for scouting quests where number of traversals of scouting objectives is the most important metric and not diversity of traversals. As an example, this type of tactic may be appropriate for scouting quests which require maximum exposure to a certain context in the world, such as visiting all traffic lights at sunset". ("Exposure") An example tactic definition may be=1/(Distance_to_objective).

Chooses random scouting objectives in a scouting quest for a vehicle to visit in order to keep driving behavior somewhat random. This can be useful in mimicking trip-like behavior, where the vehicle's own routing system may be able to dominate driving behavior. ("Popcorn") In this example, for the Example Tactic Definition 1 above, a random term may be added in order to dominate the x, y and z weighted terms in the formula. Alternatively, a definition for the Popcorn tactic may include Popcorn Tactic=Random(0,100)*s (Driving_distance_to_objective)+t(Time_to_objective). In this regard, Random(0,100) may represent a random number from 0 to 100 and therefore results in randomization in the weighing of the Driving_distance_to_object. For this tactic definition, s and t may be adjustable weights which can be selected according to the prioritization of the Popcorn tactic. The values for s and t for the Popcorn tactic may be learned over time, for instance through trial and error.

Visit the least recently seen objective ("Least Recent"). This can be useful for visiting scouting objectives which should be continually visited on an ongoing basis to maintain freshness of any collected data. In this example, a definition for a tactic that always visits the least recently seen objective may include the time since the scouting objective was last visited divided by the time since the oldest visit (e.g. how close to the beginning of the quest the scouting objective was last visited) multiplied by a normalizing factor, here 100 (though greater or lesser normalizing factors may be used)((Time_since_last_visited/Time_since_oldest_visit)*100). In this regard, the closer to the start of a quest since the scouting objective was last visited, the higher the weight will be.

Other types of tactics may involve visiting scouting objectives in a particular order, for example, to mimic a particular trip, etc. Such scouting objectives may be considered as a "compound" scouting objective which is treated as a single scouting object for the weighing processes discussed below such that a vehicle would be assigned to the scouting quest including the compound starting objective start at the initial scouting objective and proceed accordingly.

The scouting objective parameters (e.g. the distance to the scouting objective, time to the scouting objective, and the time since the scouting objective was last visited) can be determined by the fleet management system 410 and/or scouting system 620 in parallel as there are no interdependencies between parameters. To enable this, each scouting objective in the subset may be associated with an object that allows for the annotation of the scouting objective with various pieces of calculated information (parameters) that will feed into the optimization. As noted above, each scouting objective may be associated with one or more scouting quests, and each scouting quest as an associated tactic, such as the example tactics above. Therefore, each object may contain a field for the parameters for each scouting quest with which the scouting objective is associated. This field may store the values for each parameter needed for the tactic of the scouting quests.

The following is an example representation of pseudo-code for a single scouting objective, Option_1, associated with two different scouting quests (Quest_A and Quest_B). Quest_A is associated with the Popcorn tactic, a driving or other distance from the vehicle to the scouting objective of 8 m and a time to objective of 3 minutes. Quest_B is associated with the Pedantic tactic, a driving distance from the vehicle to the scouting objective of 8 m, and the time since the scouting objective was last visited is 14 hours.

```
Option_1 {
   Quest_A {
```

```
      Tactic: POPCORN
      Driving_distance_to_objective: 8m
      Time_to_objective: 3min
   }
   Quest_B {
      Tactic: PEDANTIC
      Driving_distance_to_objective: 8m
      Time_since_last_visit: 14 hours
   }
}
```

Next using the tactic definition and the scouting objective parameters, a weight for each scouting objective or an "Objective_weight" may be determined by the fleet management system 410 and/or scouting system 620. Different weight values may be determined for each scouting quest with which the scouting objective is associated (e.g. a scouting objective/scouting quest combination). Accordingly, each scouting objective may be associated with a weight for each scouting quest with which the scouting objective is associated such that each scouting objective may have multiple Objective_weights. Each Objective_weight may be determined by inputting the objective parameters for the scouting objective into the tactic definition (e.g. equation) for an associated tactic.

The following is an example representation of pseudo-code for the single scouting objective Option_1 associated with two different scouting quests (Quest_A and Quest_B) which further identifies the Objective_weight for each quest. In this example, definition for the Popcorn tactic may be w(Driving_distance_to_objective)+x(Time_to_objective) as in the example above, and similarly, the definition for the pedantic tactic may be s(Driving_distance_to_objective)–t (Time_since_last_visited) as in the example above. The "60" in the Objective_weight for Quest_B is used to convert 14 hours to minutes.

```
Option_1 {
   Quest_A {
      Tactic: POPCORN
      Distance_to_objective: 8m
      Driving_distance_to_objective: 3min
      Objective_weight: 8q + 3r
   }
   Quest_B {
      Tactic: PEDANTIC
      Driving_distance_to_objective: 8m
      Time_since_last_visited: 14hours
      Objective_weight: 8s – (14*60)t
   }
}
```

In order to create weight values for the scouting quests or "Quest weights" so that different quests can be given different priorities, the scouting quest parameters including the time since quest was last serviced or rather the time since any scouting objective in the quest was last visited in mins (Time_since_last_serviced), number of cars available to complete the quest (Number_of_available_vehicles), etc., may be combined the fleet management system 410 and/or scouting system 620 via a formula that also has adjustable weights. An example formula may include:

$$\text{Quest\_weight}=a(\text{Time\_since\_last\_serviced})+b/\text{Number\_of\_available\_vehicles}$$

In this example, a and b are adjustable weights which may be adjusted over time to maximize metrics that human operators (or computing devices) determine are relevant, such as a rate of completion or total number of visits. For instance, initially, these could be something hand-tuned in order to achieve a particular goal such as this quest must have number of available vehicles be weighted very high, because there are seldom have vehicles available that can do this quest, so when number of available vehicles>0, those vehicles should do this quest immediately. Thereafter the values can be adjusted so the whole system runs smoothly with the other scouting quests in a balanced and efficient way.

The following is an example representation of pseudo-code for the single scouting objective Option_1 associated with two different scouting quests (Quest_A and Quest_B) which further identifies the Quest weights for each scouting quest. In this example, the time since any scouting objective in the quest was last serviced (Time_since_last_serviced) for Quest_A is 5 minutes, and the time since any scouting objective in the quest was last serviced (Time_since_last_serviced) for Quest_B is 20 minutes. In addition, the number of vehicles available to perform Quest_A is 3, and the number of vehicles available to perform Quest_B is 50. This difference in the number of vehicles available to perform different quests may depend upon the constraints of the quests. For example, if each quest has different constraints, such as one quest includes constraints that require vehicles to have certain software and another quest includes constraints that require certain vehicles (e.g. certain vehicle identifies which may be specified by a human operator when setting up the quest), then at any time there might be different numbers of vehicles that are available to perform each quest.

```
Quest_weights {
  Quest_A: 5a + b/3
  Quest_B: 20a + b/50
}
Option_1 {
  Quest_A {
    Tactic: POPCORN
    Driving_distance_to_objective: 8m
    Time_to_objective: 3min
    Objective_weight: 8q + 3r
  }
  Quest_B {
    Tactic: PEDANTIC
    Driving_distance_to_objective: 8m
    Time_since_last_visited: 14hours
    Objective_weight: 8s – (14*60)t
  }
}
```

Returning to FIG. 9, at block 950, for each given scouting objective in the set of scouting objectives, a combined weight for each given scouting quest associated with the given scouting objective is determined using the first weight for the given scouting quest and the second weight for the given scouting quest. The weight values determined for each scouting objective/scouting quest combination may be combined by the fleet management system 410 and/or scouting system 620 with the weight for that scouting quest, again via a formula that also has adjustable weights. An example formula may include:

Combined_weight=$i$(Quest_weight)+$j$(Objective_weight)

where i and j are adjustable weights. As with a and b, the weights i and j may initially be selected manually and can be used as a level to allow human operators or computing devices to force particular behaviors. For example, if a particular scouting quest is important, even if the scouting objectives within that quest are not, the scouting quest may be weighted highly in order to increase the likelihood that scouting objectives with that scouting quest will be selected.

The following is an example representation of pseudo-code for the single scouting objective Option_1 associated with two different scouting quests (Quest_A and Quest_B) which further identifies the Combined_weight for each scouting objective and scouting quest combination for the scouting quest Option_1. In this regard, for the scouting option Option_1, there is a Combined_weight for Quest_A (Combined_weight_Quest_A) and a Combined_weight for Quest_B (Combined_weight_Quest_B).

```
Quest_Weights {
  Quest_A: 5a + b/3
  Quest_B: 20a + b/50
}
Option_1 {
  Quest_A {
    Tactic: POPCORN
    Driving_distance_to_objective: 8m
    Time_to_objective: 3min
    Objective_weight: 8q + 3r
    Combined_weight_Quest_A: i(a*5min + b/3) + j(8q + 3r)
  }
  Quest_B {
    Tactic: PEDANTIC
    Driving_distance_to_objective: 8m
    Time_since_last_visited: 14hours
    Objective_weight: 8s – (14*60)t
    Combined_weight_Quest_B: i(a*20min + b/50) + j(8s – (14*60)t)
  }
}
```

Returning to FIG. 9, at block 960, for each given scouting objective in the set of scouting objectives, an overall weight is determined using any determined combined weights. The combined_weights for each scouting quest may then be combined by the fleet management system 410 and/or scouting system 620 with one another to determine an overall or final weight for the scouting objective. For instance, the average of the combined weights may be determined. This average may also be multiplied by the number of quests with which the scouting objective is associated (number_of_quests_for_objective) as well as a normalizing factor, here 1/10, though larger or smaller values could be used. An example formula may include:

Overall_weight=Average(Combined_weights)*number_of_quests_for_objective/10

The following is an example representation of pseudo-code for the single scouting objective Option_1 associated with two different scouting quests (Quest_A and Quest_B) which further identifies the Overall_weight for the scouting objective Option_1. In this regard, for the scouting option Option_1, an average is taken over Combined_weight_Quest_A and the Combined_weight_Quest_B. In addition, the number_of_quests_for_objective is 2 as the scouting objective Option_1 is associated with 2 different scouting quests (Quest_A and Quest_B).

```
Quest_Weights {
  Quest_A: 5a + b/3
  Quest_B: 20a + b/50
  }
Option_1 {
  Quest_A {
    Tactic: POPCORN
    Driving_distance_to_objective: 8m
    Time_to_objective: 3min
    Objective_weight: 8q + 3r
    Combined_weight_Quest_A: i(a*5min + b/3) + j(8q + 3r)
  }
  Quest_B {
    Tactic: PEDANTIC
    Driving_distance_to_objective: 8m
    Time_since_last_visited: 14hours
    Objective_weight: 8s – (14*60)t
    Combined_weight_Quest_B: i(a*20min + b/50) + j(8s – (14*60)t)
  }
  Overall_weight = average(Combined_weigth_Quest_A, Combined_weight_Quest_B) * 2/10
}
```

Returning to FIG. 9, at block 970, one or more scouting objectives of the set of scouting objectives is selected using the determined overall weights. At block 980, the one or more selected scouting objectives are provided to the vehicle. The overall weights may then be used by the fleet management system 410 and/or scouting system 620 to rank or order the scouting objectives of the subset. The highest weighted or top few highest weighted scouting objectives may be selected and sent to the requesting vehicle by the fleet management system 410 and/or scouting system 620. If more than one scouting objective is set to a vehicle, this may enable the vehicle itself to determine whether and when it visits the scouting objectives, for instance using the map information 200. For instance, some scouting objectives may not be reachable for the vehicle for any number of reasons. In some instances, once the vehicle's computing devices 110 selects one of the scouting objectives, the vehicle may disregard the others. In this regard, once the vehicle is ready to visit another scouting objective, it can send another request to by the fleet management system 410 and/or scouting system 620, thereby always ensuring that the vehicles are visiting scouting objectives that are most important at that particular time.

As the aforementioned formulas may be applied sequentially, the resulting weight values, etc. may be normalized, for instance to be a value from 0 to 1 or 0 to 100 for ease of use and understanding.

In some instances, human operators may be allowed to specify their own formulas. In such instances, a formula parser may be used to ensure that all formulas use only supported mathematical operations, all formulas may be parsed as valid functions, tactic formulas only make use of scouting objective parameters, scouting quest weight values only make use of scouting quest parameters, the scouting quest and scouting objective combination formula only uses scouting quest weight and scouting objective weights, and the overall weights only uses the scouting quest and scouting objective combination formula output.

The features described herein may enable a more effective allocation of resources for scouting while at the same time promoting the goals (e.g. tactics) desired by human operators. The optimization considers scouting objectives in all the scouting quests a vehicle is eligible for, rather than picking a scouting quest up front and then only considering objectives within it. This allows us a more global optimization of the problem. In addition, having separate distinct steps controlled by formulas allows for the evaluation of the performance of different formulas at different steps independently and enables for the simulation of the effects of changing each variable in each formula, and different compositions of each formula, while keeping all else constant.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of distributing vehicles to perform scouting, the method comprising:
receiving, by one or more processors, a request for a scouting objective for a vehicle;
in response to the request, identifying, by the one or more processors, a set of scouting objectives that the vehicle is eligible to visit, wherein each scouting objective of the set is associated with one or more scouting quests, wherein each scouting quest includes a plurality of scouting objectives, and wherein the one or more scouting quests are tasks performed by the vehicle to ensure an accuracy of map information;
for each given scouting objective in the set of scouting objectives:
for each given scouting quest associated with the given scouting objective, determining a first weight using a set of scouting objective parameters,
for each given scouting quest associated with the given scouting objective, determining a second weight using a set of scouting quest parameters,
determining a combined weight for each given scouting quest associated with the given scouting objective using the first weight for the given scouting quest and the second weight for the given scouting quest, and determining an overall weight using any determined combined weights, selecting, by the one or more processors, one or more scouting objectives of the set of scouting objectives using the determined overall weights; and sending, by the one or more processors, the one or more selected scouting objectives to the vehicle in order to cause the vehicle to perform the one or more selected scouting objectives.

2. The method of claim 1, wherein identifying the set of scouting objectives includes identifying scouting objectives within a service area of the vehicle.

3. The method of claim 1, wherein identifying the set of scouting objectives includes determining that the vehicle meets any requirements of the set of scouting objectives.

4. The method of claim 3, wherein the requirements include hardware requirements.

5. The method of claim 3, wherein the requirements include software requirements.

6. The method of claim 1, wherein identifying the set of scouting objectives includes identifying scouting objectives based on proximity to the vehicle.

7. The method of claim 1, wherein identifying the set of scouting objectives includes identifying scouting objectives based on a time of a last visit.

8. The method of claim 1, wherein identifying the set of scouting objectives is based on a fixed number of scouting objectives which meets a latency requirement for providing scouting objectives.

9. The method of claim 1, wherein the set of scouting objective parameters includes a driving distance to a location of a scouting objective.

10. The method of claim 1, wherein the set of scouting objective parameters includes a time since a last visit to a scouting objective.

11. The method of claim 1, wherein the set of scouting objective parameters includes a whether a scouting objective has been visited.

12. The method of claim 1, wherein determining the first weight for the given scouting objective further includes combining the set of scouting objective parameters using weighted values.

13. The method of claim 12, wherein determining the first weight for the given scouting quest further includes determining the weighted values based on a tactic for completing each scouting quest with which the given scouting objective is associated.

14. The method of claim 13, wherein the tactic includes prioritizing scouting objectives that are closer to the vehicle over scouting objectives that are farther from the vehicle.

15. The method of claim 13, wherein the tactic includes prioritizing scouting objectives that were visited earlier in time.

16. The method of claim 13, wherein the tactic includes mimicking trip-like driving behavior.

17. The method of claim 1, wherein the set of scouting quest parameters includes a number of available vehicles to visit scouting objectives.

18. The method of claim 1, wherein the set of scouting quest parameters includes a time since a scouting quest has last been completed.

19. The method of claim 1, wherein determining the combined weight for each given scouting quest associated with the given scouting objective using the first weight for the given scouting quest and the second weight for the given scouting quest includes using adjustable weights for each combined first weight and second weight.

20. The method of claim 1, wherein determining the overall weight for the given scouting objective includes taking an average of the any determined combined weights.

* * * * *